United States Patent
Lederer

(10) Patent No.: US 9,131,051 B2
(45) Date of Patent: Sep. 8, 2015

(54) ESTABLISHMENT OF CONNECTIONS OVER A COMMUNICATION NETWORK TO A PARTICIPANT OF A MEETING WITHOUT SAID PARTICIPANT'S TELEPHONE NUMBER BEING KNOWN

(75) Inventor: Thomas Lederer, Herrsching (DE)

(73) Assignee: Unify GmbH & Co. KG, Munich (DE)

( * ) Notice: Subject to any disclaimer, the term of this patent is extended or adjusted under 35 U.S.C. 154(b) by 1121 days.

(21) Appl. No.: 12/529,279

(22) PCT Filed: Oct. 25, 2007

(86) PCT No.: PCT/EP2007/061448
§ 371 (c)(1),
(2), (4) Date: Sep. 11, 2009

(87) PCT Pub. No.: WO2008/110220
PCT Pub. Date: Sep. 18, 2008

(65) Prior Publication Data
US 2010/0034369 A1    Feb. 11, 2010

(30) Foreign Application Priority Data
Mar. 14, 2007  (DE) .......................... 10 2007 012 339

(51) Int. Cl.
*H04M 3/42*        (2006.01)
*H04M 3/493*       (2006.01)
(Continued)

(52) U.S. Cl.
CPC ........ *H04M 3/4935* (2013.01); *H04M 3/42059* (2013.01); *H04M 3/42323* (2013.01); *H04M 7/0024* (2013.01); *H04M 2203/2072* (2013.01)

(58) Field of Classification Search
CPC . H04M 3/56; H04M 2203/5009; H04M 3/46; H04M 3/42008; H04M 3/465; H04M 2203/4536; H04L 12/1818; H04L 12/1822
USPC .............. 379/142, 198, 201, 202.01, 203.01, 379/204.01, 205.01, 206.01; 370/260, 261, 370/262, 352, 353, 354, 355, 356, 357; 455/404.2, 414, 456, 457, 556, 416; 709/204, 205, 206, 207
See application file for complete search history.

(56) References Cited

U.S. PATENT DOCUMENTS

| 6,058,415 A | 5/2000 | Polcyn |
| 6,760,423 B1 * | 7/2004 | Todd ........................ 379/202.01 |

(Continued)

FOREIGN PATENT DOCUMENTS

| EP | 0954193 A2 | 3/1999 |
| WO | 0152511 A1 | 7/2001 |

OTHER PUBLICATIONS

International Search Report for PCT/EP2007/061448 dated Feb. 20, 2008 (Form PCT/ISA/210).

*Primary Examiner* — Fan Tsang
*Assistant Examiner* — Kharye Pope
(74) *Attorney, Agent, or Firm* — Buchanan Ingersoll & Rooney PC

(57) ABSTRACT

The present application relates to a method and a communication system with which participants of a scheduled meeting, in particular a business meeting or conference, can be reached by a telephone caller without the caller needing to know the telephone number of the participants. Conventionally, the caller who does not have available the corresponding number must obtain said number by calling a telephone switchboard or by searching in an electronic address book. This disadvantage is overcome by the subject matter of the application by the fact that a connection to a meeting participant, preferably the organizer of the meeting, is established using only the telephone number of the caller. For this purpose, the caller is identified by the caller's telephone number, and thereafter an address book is examined to determine whether the caller is a participant in a meeting. If yes, the organizer of the meeting or the organizer's telephone number is obtained, and the connection to the telephone number thus obtained is forwarded on.

20 Claims, 2 Drawing Sheets

(51) Int. Cl.
*H04M 7/00* (2006.01)
*H04L 12/16* (2006.01)

(56) References Cited

U.S. PATENT DOCUMENTS

| | | | |
|---|---|---|---|
| 6,798,753 B1* | 9/2004 | Doganata et al. | 370/260 |
| 7,295,657 B1* | 11/2007 | Keohane et al. | 379/88.23 |
| 7,903,796 B1* | 3/2011 | Kheradpir et al. | 379/88.17 |
| 2002/0027901 A1* | 3/2002 | Liu et al. | 370/352 |
| 2003/0112945 A1* | 6/2003 | Brown et al. | 379/201.01 |
| 2004/0208303 A1* | 10/2004 | Rajagopalan et al. | 379/202.01 |
| 2004/0249884 A1* | 12/2004 | Caspi et al. | 709/204 |
| 2005/0074107 A1* | 4/2005 | Renner et al. | 379/202.01 |
| 2005/0149876 A1* | 7/2005 | Kortum et al. | 715/753 |
| 2005/0185786 A1 | 8/2005 | Marwell et al. | |
| 2007/0025539 A1* | 2/2007 | Claudatos et al. | 379/211.02 |
| 2007/0162569 A1* | 7/2007 | Robinson et al. | 709/219 |
| 2007/0263825 A1* | 11/2007 | Shah et al. | 379/202.01 |
| 2008/0037748 A1* | 2/2008 | Jefferson et al. | 379/202.01 |
| 2008/0155029 A1* | 6/2008 | Helbling et al. | 709/206 |
| 2008/0159490 A1* | 7/2008 | Gaudin et al. | 379/88.16 |
| 2008/0205616 A1* | 8/2008 | Teng et al. | 379/202.01 |
| 2008/0259824 A1* | 10/2008 | Frankel | 370/260 |
| 2010/0260075 A1* | 10/2010 | Smith et al. | 370/261 |

* cited by examiner

ESTABLISHMENT OF CONNECTIONS OVER A COMMUNICATION NETWORK TO A PARTICIPANT OF A MEETING WITHOUT SAID PARTICIPANT'S TELEPHONE NUMBER BEING KNOWN

CROSS-REFERENCE TO RELATED APPLICATIONS

This application is the United States National Stage filing under 35 U.S.C. §371 of International Application No. PCT/EP2007/061448, filed on Oct. 25, 2007, and claiming priority to German Application No. 10 2007 012 339.8, filed on Mar. 14, 2007. Both of the foregoing are incorporated by reference herein.

Scheduled meetings, in particular discussions or conferences in the corporate environment, are frequently organized by an organizer. The organizer of a discussion or conference determines the participants in the discussion, creates and sends out invitations, generally has information about the availability of participants, and organizes the date and time and the location of the discussion or conference. Thus, this organizer has all information concerning the meeting, and is able to inform all participants in the meeting of any changes in the organization of the meeting, e.g., the date and time of the meeting, location of the meeting, participants in the meeting, topic of the meeting, etc. Furthermore, the meetings or discussions often take place at locations or in buildings to which the participants must first travel.

It can occur that the participant in the meeting is delayed in arriving due to traffic, or does not remember the exact time or location, such as the exact building and/or room designation. In this situation, this participant would wish to inform the organizer of the meeting or discussion of the delay or obtain the forgotten information about the discussion. If, in this situation, for example, the telephone number of the organizer is not available in a mobile terminal device that the participant is carrying, this will result in a waste of time and require significant technological effort in order to determine the telephone number of the mobile or landline terminal device of the organizer or another participant in the discussion. A possible method of transmitting information to the participants in the meeting would be to call a known person who is located near the discussion, asking that the participants be informed, or to call a telephone switchboard in order to make a note of the organizer's telephone number, or to search for the organizer's number in an electronic appointment calendar (which, however, is generally not available).

BRIEF SUMMARY OF THE INVENTION

A significant aspect of the method in accordance with the invention can be seen in the assignment of the identity or contact information of terminal devices of the communications networks to terminal-specific personal information, and of this information to appointment-specific information and identity information on participants in a meeting, and the storing of this information. A terminal device, using a specified identity, establishes a connection to the communications network in which the identification of the terminal device is determined. Using the determined identity of the terminal device and the saved information, the identity of the participant in the meeting is determined, and the connection is forwarded from the terminal device to the terminal device of the participant in the meeting using the identity determined.

A significant advantage of the invention is that, using the method in accordance with the invention, a company can set up a central identity or telephone number that allows employees of the company to reach the organizer or a participant T in a meeting or discussion in a simple fashion from their mobile terminal device EG or wired terminal device EG using the central telephone number, in order to inform him or her of a delay, to cancel or postpone the discussion on short notice, or to request discussion-specific information such as the exact date and time or location information, such as the building or room number. Automatically finding the organizer or a participant in a discussion, on the one hand, constitutes a substantial time savings, and, on the other, avoids the need to expend technological effort in order to reach the organizer or a participant in a discussion.

Additional advantageous embodiments of the method in accordance with the invention and configuration of a communication system in accordance with the invention can be found in the other claims.

BRIEF DESCRIPTION OF THE FIGURES

Below, the invention and its embodiments are discussed using two drawings.

DETAILED DESCRIPTION OF THE INVENTION

Figure 1:
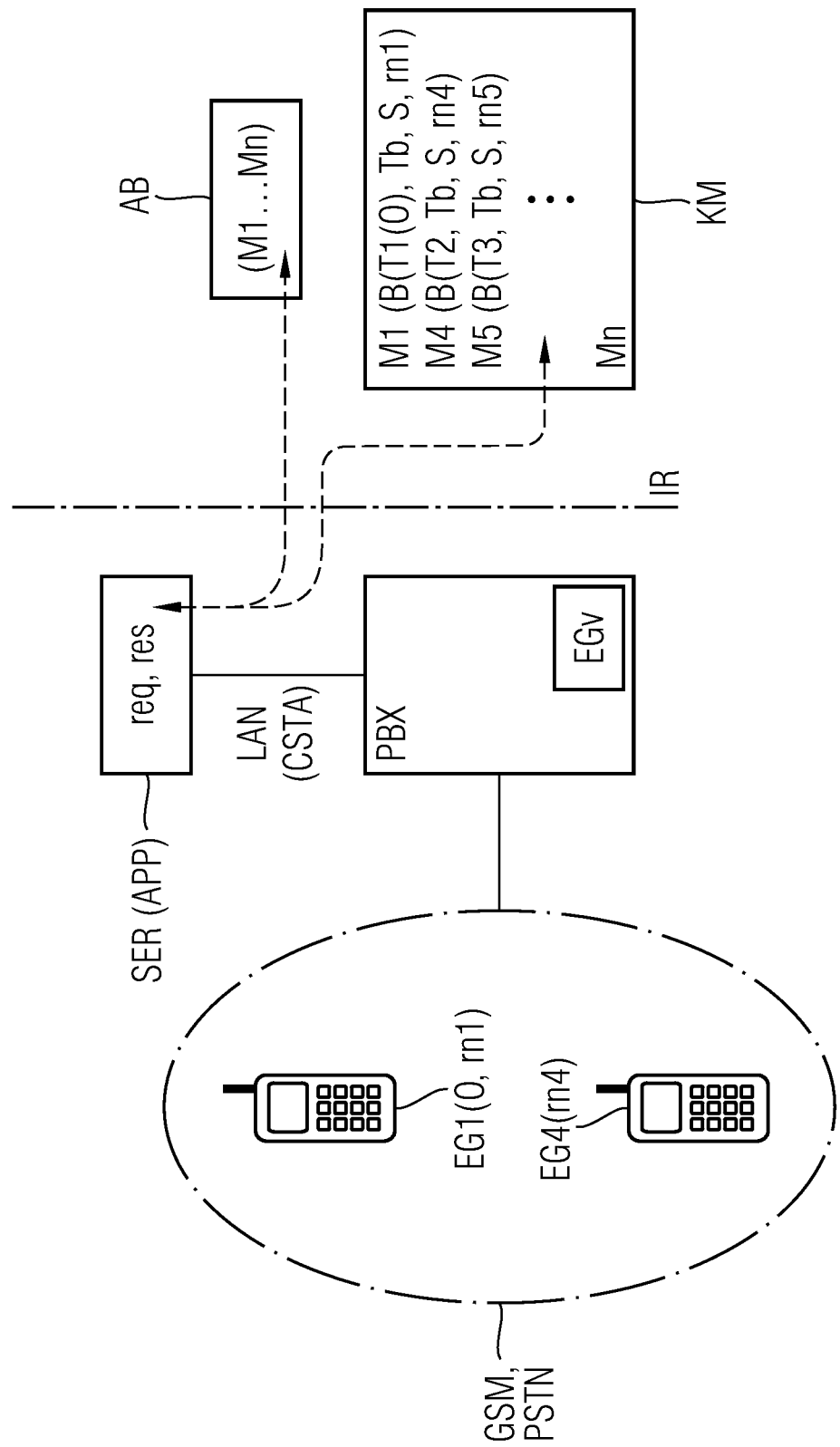
FIG. 1 Schematic diagram of a communication system to implement the method in accordance with the invention and FIG. 2 The method in accordance with the invention shown by a flow chart.

FIG. 1 shows a communication system with a switchboard system PBX connected to a wired communications network PSTN and/or a mobile telephony network GSM—shown in FIG. 1 as a single, dotdashed oval marked GSM, PSTN. In the switchboard system PBX, a virtual terminal device EGv is implemented, which is assigned a central telephone number rnv.

An application AAP is connected with the switchboard system PBX via a CSTA (Computer Supported Telecommunications Application) interface, with the application APP being implemented in a server SER in the exemplary embodiment. Using the CSTA protocol interface CSTA—standardized in ECMA—the computer-controlled server SER is coupled with a switchboard system PBX in order to control performance feature-specific applications. As an example for standards-compliant implementation, by way of example, the invention provides for the programming interface TAPI, which builds on the CSTA definitions. Physically, the server SER, by way of example, is connected to the switchboard system PBX via a local area network LAN.

Using the application APP, an address or telephone book AB can be accessed via an internal network, in particular an intranet IR; it can be accessed physically via the LAN and via a transitional device not shown—indicated in FIG. 1 by a dotdashed line marked "IR". The address or telephone book AB is most often implemented for the employees of a company in a special server—not shown—which can be contacted via the intranet IR. The application APP is activated by an information transmission from the virtual terminal device EGv of the switchboard system PBX. Alternatively, the application APP is continuously active and observes the virtual terminal device EGv for information transmissions.

FIG. 1 further shows a calendar module KM in which all appointments T of employees M1 ... Mn of a company are registered. The calendar module can, by way of example, be implemented in the form of an electronic calendar, into which the employees M1 ... Mn enter their appointments T or are automatically registered and entered upon entry into a Windows-compliant Outlook calendar. For the exemplary embodiment, it should be assumed that a discussion B on a date and time Tb at a location S—including building and room number—is entered with 3 participants T1 . . . T3, with participants T1 . . . T3 being the registered first, fourth, and fifth employee M1, M4, M5, and the organizer O of the discussion B is the first participant T1 of the discussion B or the first employee M1 of the company.

Implementation in a server—not shown—is possible; the address or telephone book AB can be implemented together with the calendar module KM in a server. The calendar module KM, in turn, is triggered via the intranet IR of the company or the local-area network LAN and via a transitional device—indicated in FIG. 1 by a dotted arrow marked IR.

It should further be assumed for the exemplary embodiment that the second participant T2 must travel to the discussion B, as the location S of the discussion B is not in the area of his workplace. Travel occurs, by way of example, via public transportation, and is interrupted due to a malfunction of the means of transportation. Participant T2 therefore wishes to inform the organizer O of the discussion B of the delay. Additionally, the second participant T2 does not recall the exact location S of the discussion B, e.g., the room and building number, and he would like additionally to reach the organizer O of the discussion B for information about the exact location S. Because he has a mobile terminal device EG2, but the telephone number rn1 of the organizer O is not saved, he will nonetheless immediately reach the organizer O of the discussion B using the method in accordance with the invention.

Figure 2:
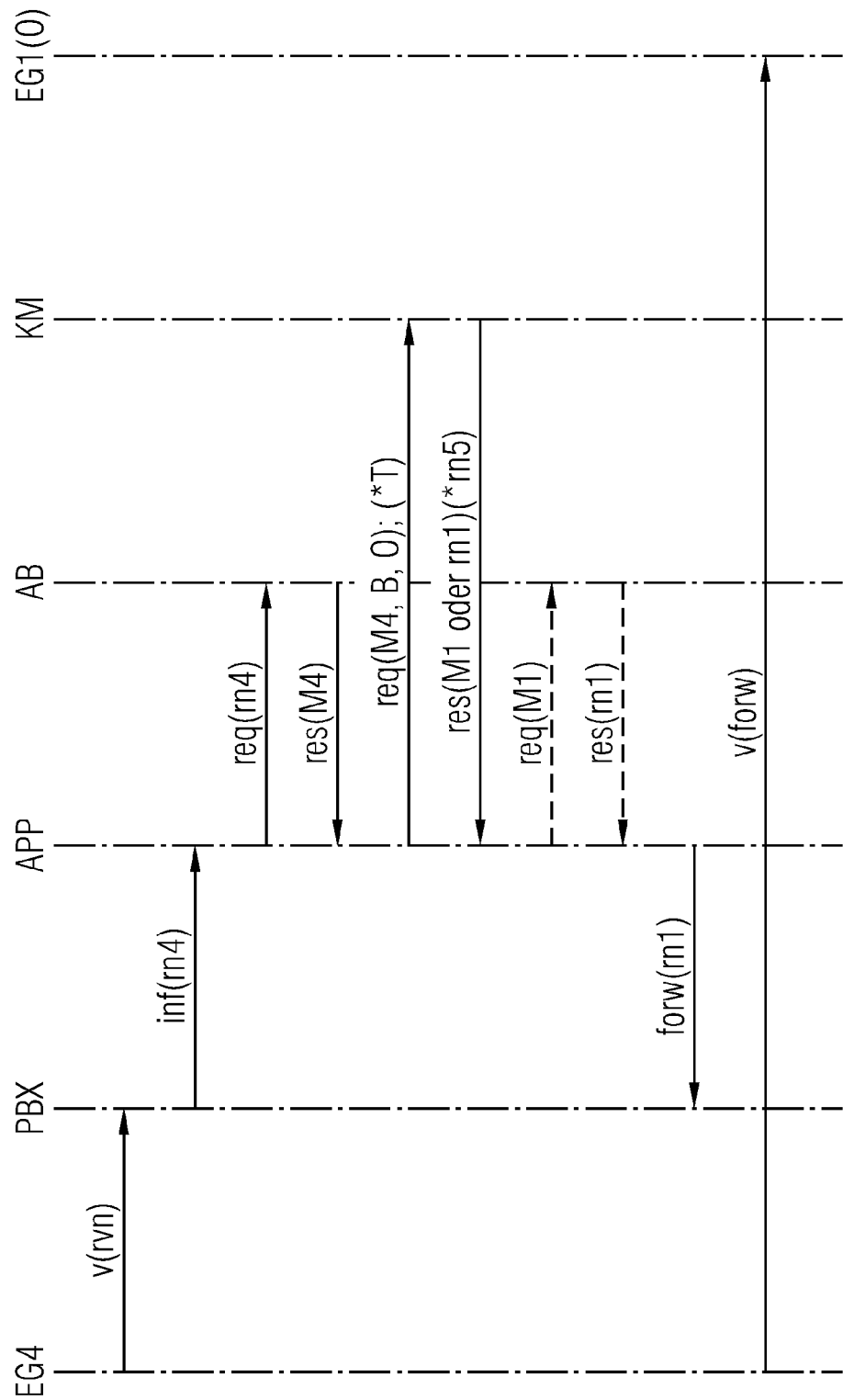

The method in accordance with the invention is explained on the basis of the flow chart shown in FIG. 2 and the communications system shown in FIG. 1. In FIG. 2, the components, such as terminal device EG4 of the fourth employee M4, of switchboard system PBX, of application APP, of the address or telephone book AB, the calendar module KM, and the terminal device EG1 of the first employee M1 of the communications system are each represented by vertical dot-dashed lines.

In accordance with the invention, a connection v to the virtual terminal device EGv of the switchboard system PBX is established and maintained using terminal device EG4 of the fourth employee M4 or of the second participant T2 in discussion B using the central telephone number rnv—indicated in FIG. 2 with an arrow marked v(rnv). The virtual terminal device EGv transmits information inf via the CSTA interface CSTA with the telephone number rn4 of the terminal device establishing the connection v to the application APP. The telephone number rn4 of the terminal device EG4 is determined by the switchboard system PBX as part of the establishment the connection and supplied to the virtual terminal device EGv.

Using the application APP, a request req is transmitted via the intranet IR with the telephone number rn4 of the terminal device establishing the connection EG4 to the address or telephone book AB—indicated in FIG. 2 with an arrow marked req(rn4). In the address or telephone book AB, the employee M4 assigned to the terminal device EG4 initiating the call is found using the transmitted telephone number rn4, and reported via a response res of the application APP—indicated in FIG. 2 by an arrow marked res(M4).

Using the application APP, a further request req is formed with the information of the fourth employee M4 and transmitted to the calendar module KM—indicated in the figure by an arrow marked req(M4). The request req also includes the question of whether the employee M4 is known to be a participant T in a discussion B, and who the organizer O of the discussion B is, including, in some cases, his telephone number rn1—indicated in FIG. 2 by the designation B, O. In the calendar module KM, using the information transmitted by the fourth employee M4, it is examined whether he is a participant T in an upcoming or currently scheduled discussion B, and, if such a discussion B is found, it is determined using the information "discussion B" and the additional parameters S,Tb, which participants T are involved in the discussion B and who the organizer O of the discussion B is. To this end, known search algorithms are used, with fast algorithms being preferred, as the connection v is still being held in the switchboard system PBX or is still in "alerting" mode.

In the exemplary embodiment, it is determined using the search algorithms that three participants T1 . . . T3 are involved in a discussion B and the first participant T1 of the discussion B is the organizer O, and that this is the first employee MI of the company. If the telephone number rn1 of the terminal device EG1 of the first employee M1 is also saved in the calendar module KM, it will be transmitted in a response res to the application APP—indicated in FIG. 2 by an arrow marked res(rn1). Alternatively, in the absence of the telephone number rn1 of the first employee M1, the information on employee M1 can be reported in the response res of the application APP—indicated in the figure by the designation "M1". In this case, the telephone number rn1 of the first employee M1, i.e., the organizer O of the discussion B, must be determined by a further request req to the address or telephone book AB with the information employee M1, with the request req comprising the request for the telephone number rn of the first employee M1—indicated in FIG. 2 by a dashed arrow marked req (M1). In the address or telephone book AB, the telephone number rn1 of the first employee M1 is determined with the information M1 and transmitted with a response res to the application APP—indicated in FIG. 2 by a dashed arrow marked res(rn1).

After receipt of the telephone number rn1 of the first employee M1 or the organizer O, a switchboard message forw with the telephone number m1 of the first employee M1 is formed and transmitted via the CSTA interface CSTA to the switchboard system PBX. The switchboard message forw causes the connection v established by the second terminal device EG2, which is still on hold or in alerting mode, to be forwarded in the switchboard system PBX from the virtual terminal device EGv to the first terminal device EG1 of the first employee M1 or organizer O. Preferably, the feature "call forwarding" or "deflect call request" generally present in the switchboard system PBX is used for this purpose. Now, the first employee M1 or the second participant T2 can inform the organizer O of the discussion B that he will be delayed in arriving at the discussion due to a malfunction in public transportation, or he can request the exact location S, e.g., building and room number, of the discussion B or the exact starting time of the discussion B, or he can coordinate a postponement of the discussion B, which may already be in progress, with organizer O.

If, after forwarding of the connection v to an organizer O of the meeting, it is found that a voice mail or answering machine function is activated, or that the organizer O does not accept the connection v within a specifiable time frame, the application APP can transmit a further request to the telephone book AB in order to determine an alternative number rn of the organizer (e.g., mobile phone) or a further request req to the calendar module KM can be initiated in order to find another participant T in the discussion B—indicated in the figure with a (*T) on the arrow marked req (M4,B,O). In accordance with the exemplary embodiment, the additional participant T in the discussion B to be found is either the third participant T3 or the identity or telephone number rn5 of the fifth employee M5. This telephone number rn5 is reported to the application APP in a response res—indicated in FIG. 2 with an additional designation (*rn5) on the arrow marked res (M1 or rn1). The application APP reports the telephone number rn5 of the fifth employee M5 to the switchboard system PBX in a switchboard message forw, in response to which the connection v is forwarded in the switchboard system PBX to the terminal device EG of the fifth employee M5—not shown in FIGS. 1 and 2.

Using the method in accordance with the invention, a company can set up a central identity or telephone number rnv that allows employees M of the company, using the central telephone number rnv on their mobile terminal device EG or a wired terminal device EG at the workplace to reach the organizer O or a participant T of a meeting or discussion B in a simple fashion in order to inform them of a delay or to cancel or postpone the discussion on short notice, or in order to obtain information related to the discussion, such as the exact date and time or the exact location, such as the building or room number. By automatically finding the organizer O or a participant T in a discussion, on the one hand, a substantial time savings is achieved, and, on the other, a technological effort required to reach the organizer O or a participant T of a discussion are avoided.

The invention claimed is:

1. A method for automatic establishment of a connection to a participant in a scheduled meeting via at least one communications network, comprising:
    a calling terminal device connecting to a switchboard system to initiate a call;
    the switchboard system determining address information associated with the calling terminal device in response to the calling terminal device connecting to the switchboard system to initiate the call;
    the switchboard system transmitting the determined address information associated with the calling terminal device to a server;
    the server transmitting the address information associated with the calling terminal device to an address book for determining an identity associated with the address information of the calling terminal device;
    the server determining a calendar event associated with a user of the calling terminal device based upon the identity received from the address book;
    the server determining an address of a terminal device associated with a calendar event participant that is not the user of the calling terminal device based upon the determined calendar event;
    the server sending the address of the terminal device associated with the calendar event participant to the switchboard system; and
    the switchboard system automatically establishing a connection between the calling terminal device and the terminal device associated with the calendar event participant utilizing the address of the terminal device associated with the calendar event participant received from the server.

2. The method of claim 1 wherein the server determining the calendar event associated with the user of the calling terminal device based upon the identity received from the address book comprises:
    an application of the server transmitting a request to a calendar module of the server or a calendar module of a computer device to obtain information relating to any calendar events associated with the user of the calling terminal device; and
    the server receiving calendar event information associated with the user of the calling terminal device.

3. The method of claim 2 wherein the calendar event information is comprised of an identity of the calendar event participant assigned to a calendar event to which the user of the calling terminal device is associated.

4. The method of claim 3 wherein the calendar event information is also comprised of an address for at least one terminal device associated with the calendar event participant assigned to the calendar event to which the user of the calling terminal device is associated.

5. The method of claim 3 wherein the server determining the address of the terminal device associated with the calendar event participant that is not the user of the calling terminal device based upon the determined calendar event comprises:
    the server transmitting a request to the address book comprising an identity of the calendar event participant assigned to the calendar event to obtain an address for at least one device associated with the identity of at least one participant;
    the server receiving the address of the terminal device associated with the calendar event participant from the address book.

6. The method of claim 5 wherein the address book is hosted by a computer device and the calendar module is stored on the server.

7. The method of claim 1 wherein the calendar event participant is an organizer and the calendar event is a conference organized by the organizer.

8. The method of claim 1 further comprising:
    upon a determination that the switchboard system establishing a connection between the calling terminal device and the terminal device associated with the calendar event participant results in an established connection with a voice mail function associated with the calendar event participant, the server determining an identity of another calendar event participant and an address of a terminal device associated with the other calendar event participant; and
    the switchboard system establishing a connection between the calling terminal device and the terminal device associated with the other calendar event participant via the determined address of the terminal device associated with the other calendar event participant.

9. The method of claim 1 wherein the address information is a telephone number of the calling terminal device and the calling terminal device is a telephone device and wherein:
    the switchboard system automatically establishing the connection between the calling terminal device and the terminal device associated with the calendar event participant utilizing the address of the terminal device associated with the calendar event participant received from the server occurs such that the switchboard system connects the calling terminal device to the terminal device associated with the calendar event participant in response to the calling terminal device connecting to the switchboard system to initiate the call such that input identifying the address of the terminal device associated with the calendar event participant is not needed to be transmitted from the calling terminal device to the switchboard system for establishing the connection between the calling terminal device and the terminal device associated with the calendar event participant.

10. The method of claim 1 wherein the server is a first server and the address book is hosted by a second server and wherein the switchboard system has a virtual terminal device, the virtual terminal device having a predefined telephone number and wherein the calling terminal device connects with the virtual terminal device when connecting to the switchboard system to initiate the call.

11. A communication system for automatic establishment of a connection to a participant in a scheduled meeting comprising:
- a first terminal device associated with a first user;
- a second terminal device associated with a second user;
- a switchboard system being communicatively connectable to the first terminal device and being communicatively connectable to the second terminal device, the switchboard system having a virtual terminal device;
- a server having an application communicatively connectable to the switchboard system;
- an address book communicatively connectable to the server;
- the first terminal device connecting to the virtual terminal device of the switchboard system to initiate a call;
- the switchboard system determining address information associated with the first terminal device and the virtual terminal device transmitting address information associated with the first terminal device to the server;
- the server transmitting the address information associated with the first terminal device received from the switchboard system to the address book for determining an identity of the first user;
- the address book identifying the first user to the server based upon the address information transmitted by the server;
- the server determining a calendar event associated with the first user based upon the identity received from the address book;
- the server determining that the second user is associated with the calendar event;
- the server sending a communication address of the second terminal device to the switchboard system based upon the determination of the second user being associated with the calendar event; and
- the switchboard system automatically establishing a connection between the first terminal device and the second terminal device based upon the communication address of the second terminal device received from the server to connect the first terminal device to the second terminal device in response to the first terminal device connecting to the switchboard system to initiate the call such that input identifying the communication address of the second terminal device is not needed to be transmitted from the first terminal device to the switchboard system for establishing the connection between the first terminal device and the second terminal device.

12. The system of claim 11 wherein the server determining the calendar event associated with the first user based upon the identity received from the address book comprises the server evaluating calendar entries stored in a calendar module of the server to determine the calendar event.

13. The system of claim 11 wherein the server determining the calendar event associated with the first user based upon the identity received from the address book comprises the server sending a request to a calendar module stored on a computer device requesting information from at least one calendar entry stored in the calendar module associated with the first user.

14. The system of claim 11 wherein the server determining that the second user is associated with the calendar event is comprised of:
- the server sending a request to a calendar module that comprises an identity of the first user;
- the server receiving a response from the calendar module that responds to the request sent to the calendar module;
- the server determining that at least one of an identity of the second user and an address of the second terminal device is included within calendar event information within the response received from the calendar module.

15. The system of claim 14 wherein the calendar module is stored in the server.

16. The system of claim 11 wherein upon a determination that the switchboard system establishing a connection between the first terminal device and the second terminal device results in an established connection with a voice mail function associated with the second user, the server determining an identity of a third user that is a participant of the calendar event and an address of a terminal device associated with the third user; and
- the switchboard system establishing a connection with the terminal device associated with the third user via the determined address of the terminal device associated with the third user.

17. The system of claim 16 wherein the server communicates with a calendar module to determine the identity of the third user and sends the identity of the third user to the address book to determine the address of the terminal associated with the third user.

18. The system of claim 11 wherein the first terminal device is a device having an assigned telephone number and the second terminal device is a device having an assigned telephone number and wherein the virtual terminal device of the switchboard system has an assigned telephone number.

19. The system of claim 11 wherein the server communicates with the switchboard system via a computer supported telecommunications application interface.

20. The system of claim 11 wherein the switchboard system is connected to a mobile telephony network and a wired communications network.

* * * * *